United States Patent
Nieuwenhius (10) Patent No.: US 9,769,632 B2
(45) Date of Patent: Sep. 19, 2017

(54) MESSAGING SYSTEM AND METHOD WITH ADAPTIVE PACKET AND MOBILE NETWORK MESSAGE PATHS

(71) Applicant: MARKPORT LIMITED, Dublin (IE)

(72) Inventor: Taco Nieuwenhius, Utreacht (NL)

(73) Assignee: MARKPORT LIMITED (IE)

( * ) Notice: Subject to any disclaimer, the term of this patent is extended or adjusted under 35 U.S.C. 154(b) by 0 days.

(21) Appl. No.: 14/419,455

(22) PCT Filed: Apr. 25, 2013

(86) PCT No.: PCT/EP2013/058651
§ 371 (c)(1),
(2) Date: Feb. 3, 2015

(87) PCT Pub. No.: WO2014/023445
PCT Pub. Date: Feb. 13, 2014

(65) Prior Publication Data
US 2015/0208213 A1      Jul. 23, 2015

Related U.S. Application Data

(60) Provisional application No. 61/681,657, filed on Aug. 10, 2012.

(51) Int. Cl.
*H04W 4/00* (2009.01)
*H04W 4/14* (2009.01)
(Continued)

(52) U.S. Cl.
CPC ............. *H04W 4/14* (2013.01); *H04L 51/046* (2013.01); *H04L 51/18* (2013.01); *H04W 4/12* (2013.01); *H04W 8/02* (2013.01)

(58) Field of Classification Search
CPC ........ H04L 51/046; H04L 51/18; H04W 4/12; H04W 4/14; H04W 8/02; H04W 8/26; H04W 40/00; H04W 40/02; H04W 4/16; H04W 4/22; H04W 80/04; H04W 84/16; H04W 8/04; H04M 3/42382; H04M 2203/1091; H04M 2203/652;
(Continued)

(56) References Cited

U.S. PATENT DOCUMENTS 5,742,905 A * 4/1998 Pepe ...................... H04L 12/58
379/211.01
7,058,036 B1 * 6/2006 Yu ...................... H04L 12/5835
370/335
(Continued)

OTHER PUBLICATIONS

International Preliminary Report on Patentability; PCT/EP2013/058651; dated Feb. 10, 2015.
(Continued)

*Primary Examiner* — Keith Fang
*Assistant Examiner* — B. M. M Hannan
(74) *Attorney, Agent, or Firm* — Ohlandt, Greeley, Ruggiero & Perle, L.L.P.

(57) ABSTRACT

A gateway (G) interfaces with a packet (IM) network (N) a mobile (GSM) network (N2), a HLR, an IM server (S1) and an SMSC (S2). The gateway (G) has a trajectory database (D) which is dynamically maintained and is accessed to determine in real time the optimum communication paths for messages.

13 Claims, 7 Drawing Sheets

(51) Int. Cl.
*H04L 12/58* (2006.01)
*H04W 4/12* (2009.01)
*H04W 8/02* (2009.01)

(58) Field of Classification Search
CPC ......... H04M 2207/20; H04M 3/42314; H04M 3/546; H04M 7/006; H04M 7/1235
USPC ........ 455/432.3, 466, 414.4, 435.1; 370/338, 370/352, 401, 466
See application file for complete search history.

(56) References Cited

U.S. PATENT DOCUMENTS

| | | | | | |
|---|---|---|---|---|---|
| 2002/0143916 | A1* | 10/2002 | Mendiola | ............. | G06Q 10/107 709/223 |
| 2006/0068762 | A1* | 3/2006 | Baldwin | ................ | H04W 4/12 455/412.1 |
| 2006/0281474 | A1* | 12/2006 | Domville | ............. | H04L 51/066 455/466 |
| 2007/0110076 | A1* | 5/2007 | Brouwer | ................ | H04W 4/14 370/395.52 |
| 2008/0114881 | A1* | 5/2008 | Lee | ......................... | H04L 12/58 709/227 |
| 2008/0148154 | A1 | 6/2008 | Burrell et al. | | |
| 2008/0287148 | A1* | 11/2008 | Silver | ................. | H04L 12/5895 455/466 |
| 2009/0129372 | A1* | 5/2009 | Pandey | .............. | G06Q 30/0267 370/352 |
| 2009/0138563 | A1* | 5/2009 | Zhu | ........................ | H04W 4/14 709/206 |
| 2009/0318174 | A1* | 12/2009 | Tarleton | .................. | H04W 4/14 455/466 |
| 2010/0331021 | A1* | 12/2010 | Bushnell | ................. | H04L 51/04 455/466 |
| 2011/0093949 | A1 | 4/2011 | Macrae | | |
| 2011/0134843 | A1* | 6/2011 | Noldus | ............... | H04W 60/005 370/328 |
| 2011/0281589 | A1 | 11/2011 | De Beer | | |
| 2012/0155459 | A1* | 6/2012 | Bouthemy | .............. | H04L 51/04 370/389 |
| 2012/0165049 | A1 | 6/2012 | Arnold et al. | | |

OTHER PUBLICATIONS

International Search Report; PCT/EP2013/058651; dated Jul. 19, 2013.

* cited by examiner

MESSAGING SYSTEM AND METHOD WITH ADAPTIVE PACKET AND MOBILE NETWORK MESSAGE PATHS

FIELD OF THE INVENTION

The invention relates to messaging.

PRIOR ART DISCUSSION

U.S. 2012/0165049 (RIM) describes a system in which SMS-only contacts are integrated into an IM environment.

U.S. 2008/0148154 (Microsoft) describes a system which guides communication via an integrated communication server.

Over the past decade Short Messaging has evolved into a huge success by seamlessly connecting people from all over the world. One of the most important reasons behind this success is the fact that it is based on open, fully standardized technology that is supported by each handset, wherever in the world. The last couple of years have shown the introduction of various proprietary Instant Messaging services that rely on the more open and flexible IP channel for their communication. Given their proprietary nature, these Instant Messaging services are often enriched with features that are not easily implemented within the SMS paradigm, such as photo attachments and group messaging. In addition the transport mechanism of these Instant Message services is mobile IP, where they only consume a very small amount of data that is charged from the subscribers' data bundle, so that consumers experience these services as being virtually free of charge.

The fact that Instant Message services are proprietary leads to a situation where users form closed parallel communities. Members of each community can communicate with one another as long as both sender and receiver use the same Instant Messaging service. Users that do not have an Instant Messaging client installed, or that use a different Instant Messaging Service, cannot be reached from within one's favorite Instant Messaging client.

The invention is therefore directed towards providing for improved messaging.

SUMMARY OF THE INVENTION

According to the invention, there is provided a messaging system comprising:
- an interface for communicating via a packet network;
- an interface for communicating via a mobile network;
- a messaging server; and
- a message service centre;
- wherein the system comprises a processor adapted to interwork between the packet and mobile networks for communication of messages, and in which the system comprises:
  - a gateway between the messaging server and the message service centre, and
  - a trajectory database, and the processor is adapted to access said database to determine trajectory data for a message between a particular sender and a particular recipient.

In one embodiment, the messaging server is an instant messaging server.

In one embodiment, the message service centre is an SMSC.

In one embodiment, the database includes a timestamp for each stored trajectory. Preferably, the processor is adapted to update the time stamp with each access. In one embodiment, the system is adapted to archive or delete stored trajectories according to age.

In one embodiment, the message service centre is adapted to use the trajectory database. Preferably, the message service centre is adapted to attempt a packet network delivery via the messaging server. In one embodiment, the messaging server is adapted to determine that packet network delivery is not possible or likely, and to inform the message service centre accordingly. In one embodiment, the message service centre is adapted to update the trajectory database if it receives a negative acknowledgement from the messaging server.

In another aspect, the invention provides a messaging method performed by a messaging system comprising a gateway having interfaces for communicating with a mobile network and a packet or data network, a messaging server, and a message service centre, the method comprising the steps of the system interworking between the mobile and packet networks for message communication by:
- the gateway maintaining a trajectory database, and
- the processor accessing the trajectory database to determine trajectory data for a message between a particular sender and a particular recipient.

In one embodiment, the system handles a response message sent via the mobile network towards a packet domain, in which:
- a response message is sent from a recipient device B to a sender device A via the service centre,
- the service centre queries a trajectory database and discovers that a prior message from the device A in the packet domain to the device B in the mobile network domain was sent earlier,
- the service centre uses this information to decide to query a HLR,
- from the HLR response the service centre deduces whether or not the device A currently has a mobile data connection,
- if the device A has a mobile data connection then the service centre receives the address of the device A's serving support node,
- if the device A does not have a mobile data connection then the service centre receives the address of the device A's switching centre, and
- the service centre responds back to the device A that it has received the device A's message.

In one embodiment, the system performs a delivery into the packet domain via the packet network, in which using a stored trajectory from a device A to a device B the service centre decides to route the message into the packet domain.

In one embodiment, the system attaches connectivity information retrieved from a HLR to the message and initiates delivery into the packet domain, when this message arrives in the packet domain, the messaging server uses the device A's mobile data presence information to decide to keep the message in the packet domain for immediate or short term delivery and to positively acknowledge the message to service centre, and the message is delivered to the device A from which it is positively acknowledged.

In one embodiment, the messaging server also uses data indicating the last time it communicated with the device A.

Preferably, the method handles an unsuccessful delivery into the packet domain via the packet network.

In one embodiment, the messaging server uses data including at least A's mobile data presence information to decide that delivery over the packet switched network $N_1$ is not possible or not likely.

In one embodiment, the system negatively acknowledges the message to the service centre, the reception of this negative acknowledgement triggers the service centre to remove a stored trajectory for routing from A to B and to commence delivery over the mobile network using a mobile network protocol such as SMS instead.

In one embodiment, the system handles a situation in which A decides to submit a message via the mobile network intended for B, despite the fact that the packet network was used for communication with B earlier.

In one embodiment, the system performs this interworking if A is not present on the packet network for a prolonged time.

In one embodiment, upon message arrival the service centre queries a trajectory database and removes the trajectory from A to B from it in order to optimize interactions between the mobile and packet domains.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

The invention provides a system with a gateway having processors network architecture, routing logic and functionality to integrate Instant Messaging (IM) services of arbitrary nature with SMS. It allows IM subscribers to communicate over SMS with non-IM users (hereafter referred to as SMS users). It also facilitates the return path when the SMS users respond to messages originating in the IM domain. Also, it caters for situations where IM users are not available over IP for a prolonged time, providing a presence-based fallback to SMS.

The architecture is illustrated in FIGS. 1 to 7. It consists of the following elements: a packet switched network $N_1$ (WiFi, GPRS, UMTS, LTE, . . . ), a mobile network $N_2$ (GSM, CDMA, GPRS, UMTS, LTE, . . . ), an HLR/HSS H (serving the latter), an IM server $S_1$ (in the packet switched domain), an SMSC $S_2$, a gateway G, and a trajectory database D.

In addition, mobile users A and B are defined, whereby A has an IM client X installed while B does not have client X installed. The invention allows A to communicate with B from within his client X and B to respond to the message from A from within his SMS client. Both A and B will use only one client, unless A is no longer available in the IM domain for a prolonged time. During installation of the IM client X on A's mobile device, B's subscription status is checked on the IM server $S_1$ where it is found that B is not an IM user and that consequently B is marked as an SMS user within A's client. For clarity purposes separate drawings are used for message submission phases and message delivery phases.

Figure 1:
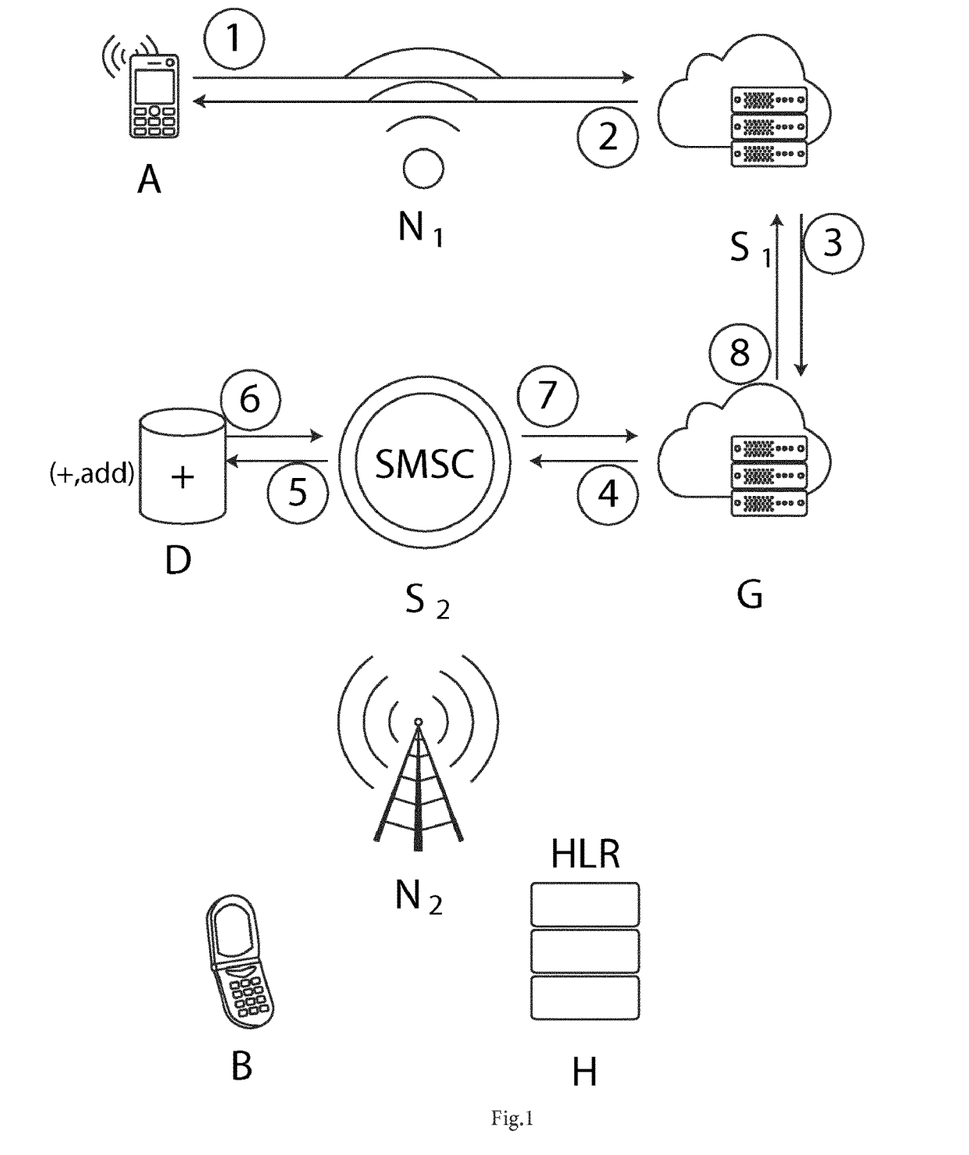
FIG. 1 shows submission of an SMS from an IM user A to an SMS user B.

FIG. 1 shows IM device A submitting a message intended for delivery to device B using the IP network $N_1$ (1). In this message the recipient device B is marked as an SMS user. The IM server $S_1$ acknowledges the arrival of the message (2) and decides on the basis of B's status as an SMS user to route this message into the operator domain for delivery over SMS (3). Depending on the existing infrastructure $S_1$ can use the gateway G for submission of this message to the SMSC $S_2$ offered by the operator ((3) and then (4)) or access the SMSC $S_2$ directly (skipping step (3)). For the SMS submission interface a variety of choices exists in the field: Short Message Peer to Peer Protocol (SMPP) [XXX], Uniform Computer Protocol (UCP) [XXX], Mobile Messaging Application Protocol (MMAP) [XXX], Parlay-X [XXX], Mobile Messaging Application Protocol (MMAP) [XXX] and various others. The MSISDN of the device A is put into the originator address of the submission operation and that of B into the recipient address of the submission operation.

The SMSC $S_2$ is equipped with a trajectory database D, where the trajectory A→B is now registered together with a timestamp (5). The trajectory consists of the A-address (originator of the trajectory) and the B-address (terminator of the trajectory). Both are contained in the message described in step (4). If the trajectory already exists then only the timestamp is renewed. The presence of a trajectory timestamp in the database D allows for maintenance whereby old entries that haven't been used for a particular time can be cleared when there is a shortage of resources. Once the registration is acknowledged (6), the SMSC $S_2$ acknowledges the arrival and successful processing of the message towards the IM server $S_1$, either via the gateway G ((7) and (8)) or directly.

Figure 2:
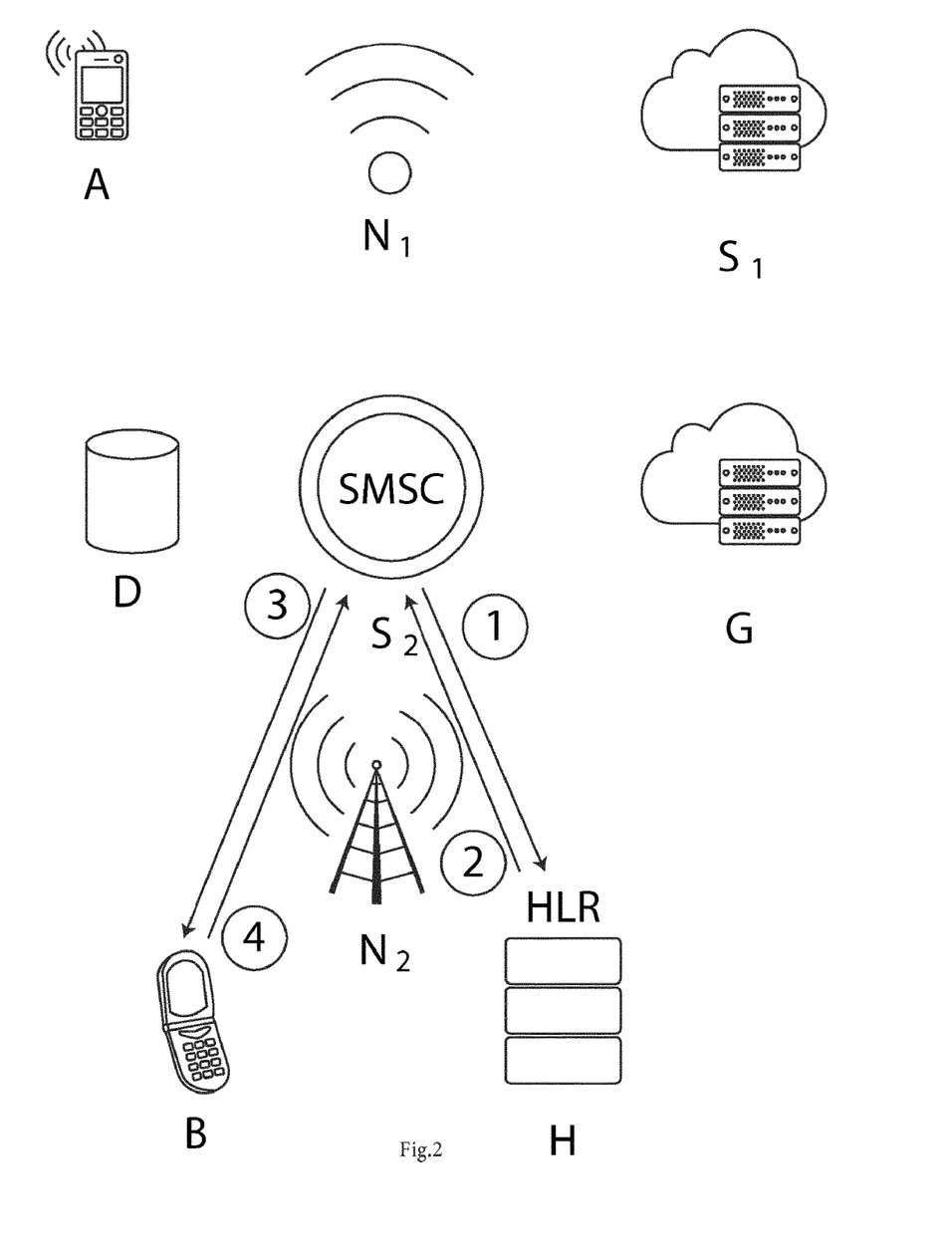
FIG. 2 shows delivery of an SMS from an IM user A to an SMS user B.

FIG. 2 follows directly on FIG. 1 and illustrates the standard delivery path over the mobile network $N_2$ of the message submitted earlier. In step (1) the SMSC $S_2$ interrogates the HLR H whereupon H responds with the whereabouts of the device B (2). Once B's location is known the SMSC $S_2$ then delivers the message to B (3) from which the message arrival is acknowledged (4). After successful delivery the SMSC $S_2$ will remove the message from its buffers.

Figure 3:
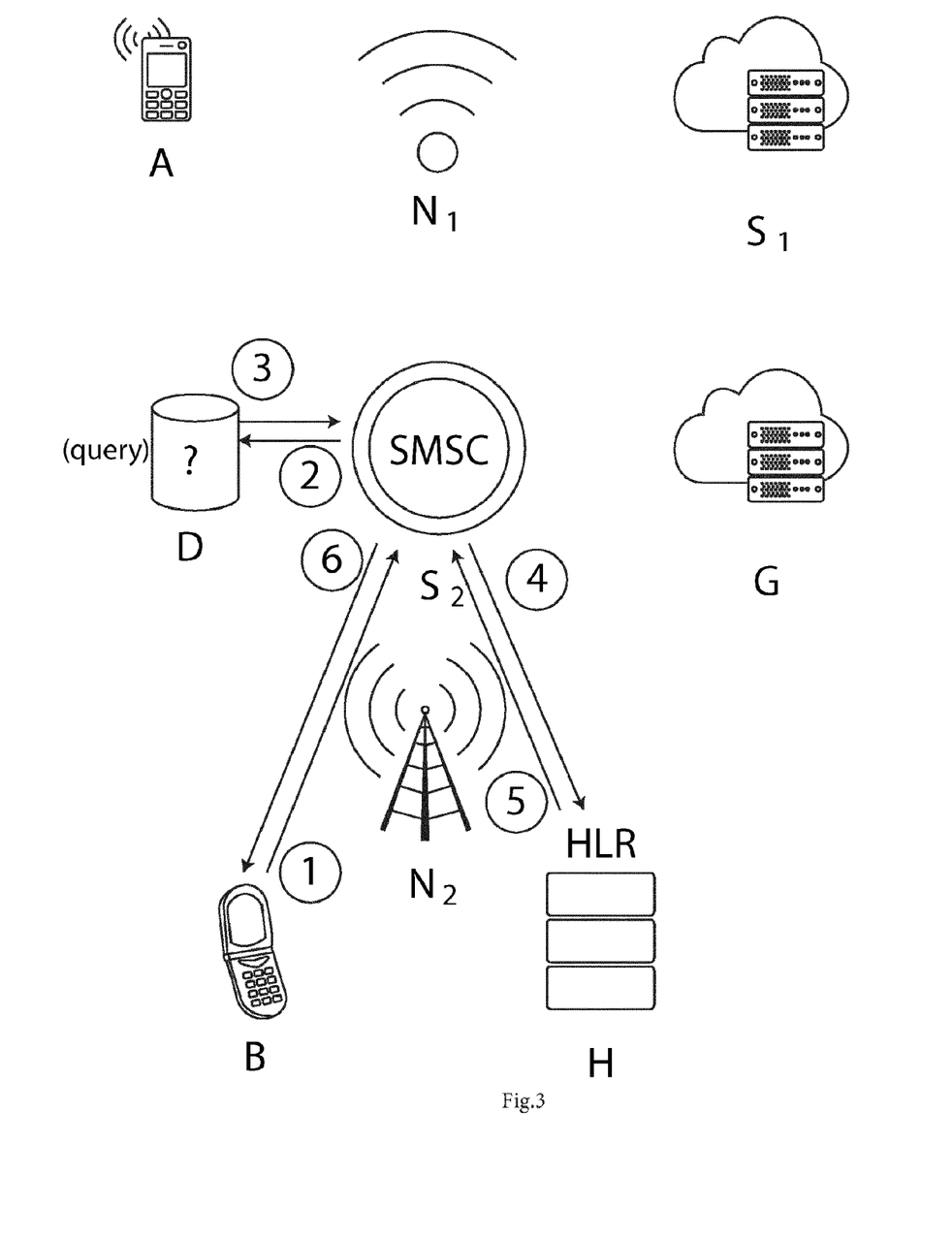
FIG. 3 shows submission of a response SMS from an SMS user B to an IM user A.

FIG. 3 illustrates the handling of a response message via the network $N_2$ towards the IM domain. B responds to A and a message is sent from B to the SMSC $S_2$ (1). Upon message arrival the SMSC $S_2$ queries its trajectory database D (2) and discovers that a prior message from A in the IM domain to B in the SMS domain was sent earlier (3). The SMSC $S_2$ uses this information to decide to query the HLR H (4). From the response from HLR H (5) the SMSC $S_2$ deduces whether or not A currently has a mobile data connection. If A has a mobile data connection then the SMSC $S_2$ will receive the address of A's Serving GPRS Support Node (SGSN) in (5). If A does not have a mobile data connection then the SMSC will receive the address of A's Mobile Switching Centre (MSC) (MSC) in (5). Finally, the SMSC $S_2$ responds back to A that it has received A's message (6).

Figure 4:
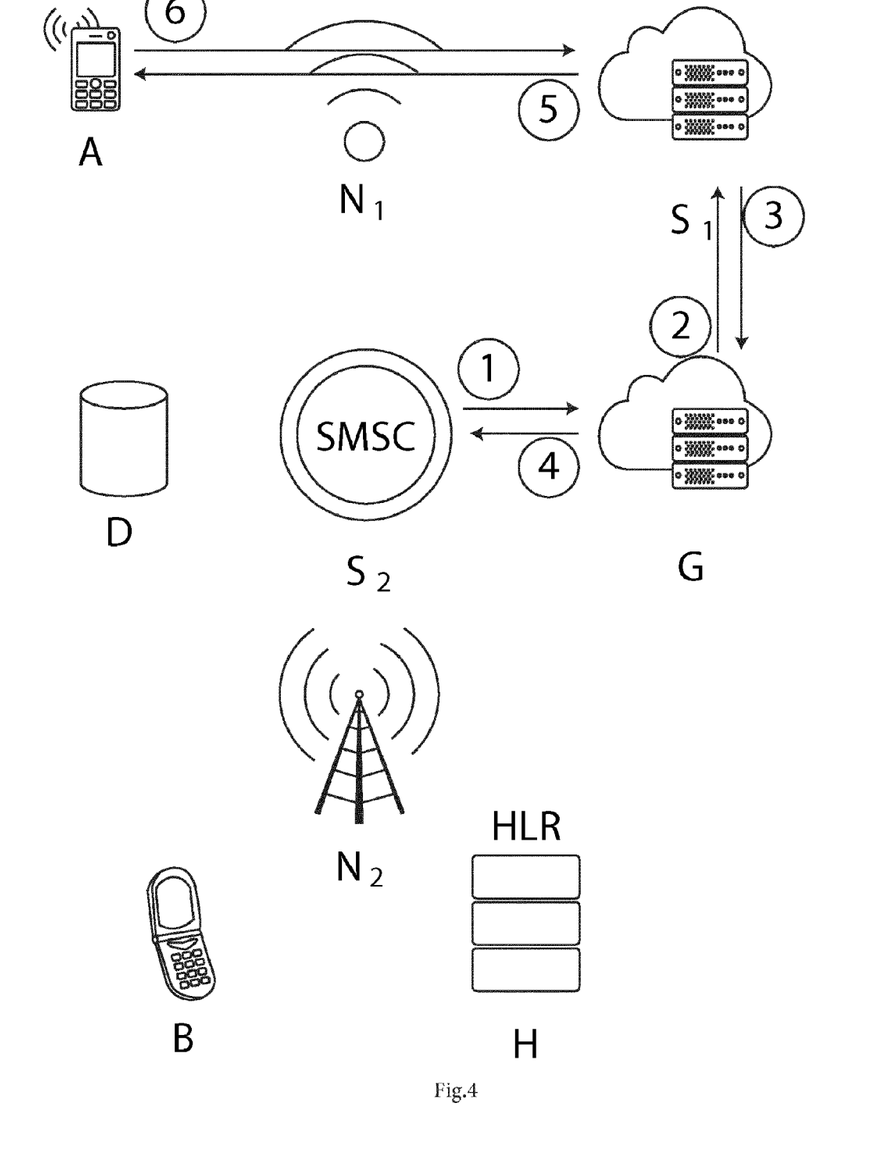
FIG. 4 shows successful delivery of a response SMS from an SMS user B to an IM user A.

FIG. 4 follows directly on FIG. 3 and illustrates a successful delivery into the IM domain via the packet switched network $N_1$. Given the presence of the trajectory A→B in the cache D, the SMSC $S_2$ decides to route the message into the IM domain. It attaches the retrieved mobile data connectivity information retrieved from H to the message and initiates delivery into the IM domain, either via the gateway G ((1) and (2)) or directly. The exact data structure used to carry A's data connectivity in the operations (1) and (2) is considered an implementation choice and therefore left open. An example is the addition of a vendor-specific optional parameter to a deliver_sm operation of the Short Message Peer-to-Peer Protocol (SMPP). This new optional parameter could indicate mobile data connective in a binary fashion, YES (value 1) or NO (value 0). Once this message arrives in the IM domain, the IM server $S_1$ uses A's mobile data presence information (and other factors it deems to be important, such as the last time it communicated with the particular user A) to decide to keep the message in the IM domain for immediate or short term delivery and to positively acknowledge the message to the SMSC $S_2$ ((3) and (4)). Next, the message is delivered to its intended recipient A (5) from which it is positively acknowledged (6).

Figure 5:
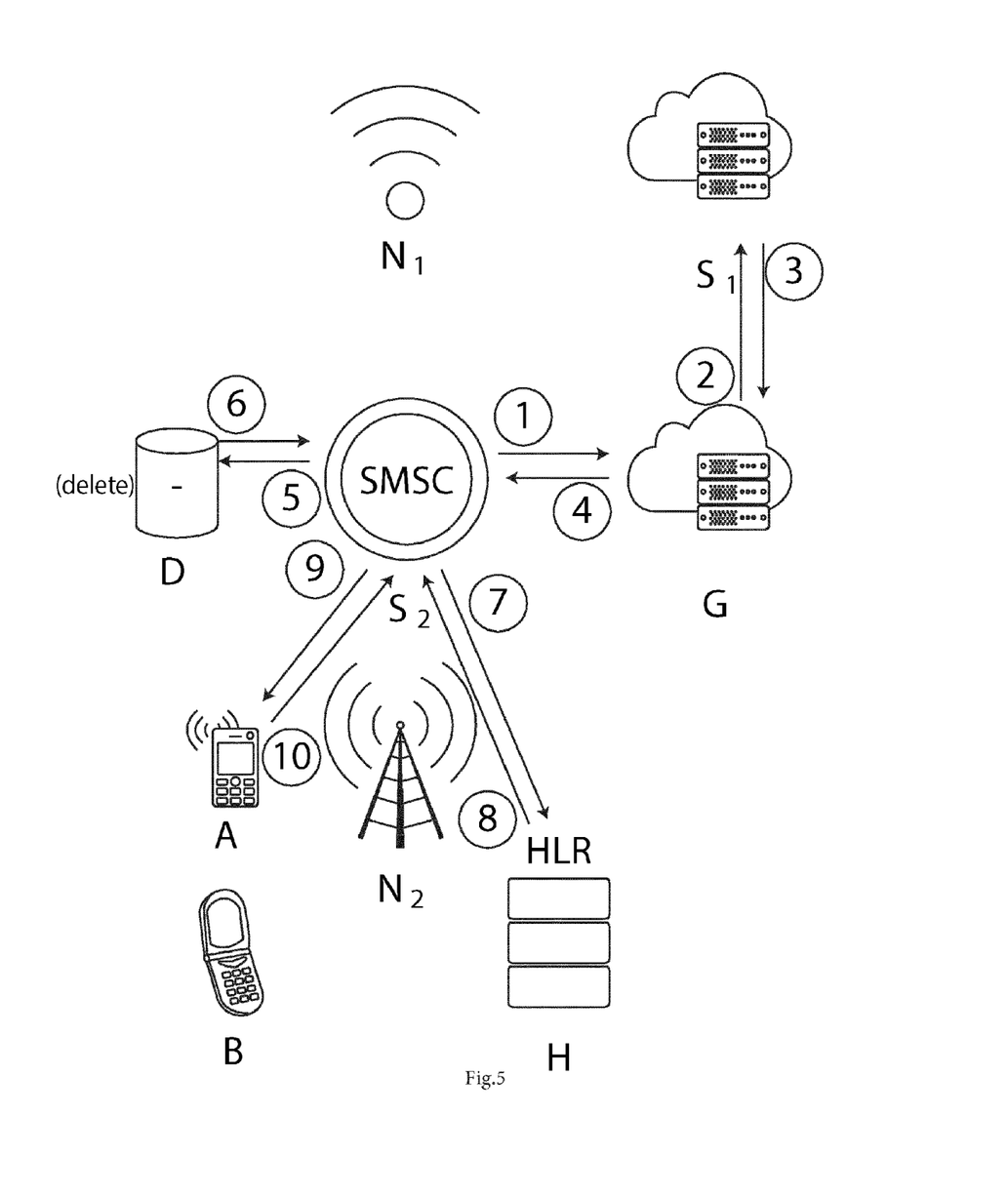
FIG. 5 shows fallback to SMS of a response SMS from an SMS user B to an IM user A.

FIG. 5 also follows directly on FIG. 3 and illustrates an unsuccessful delivery into the IM domain via the packet switched network $N_1$. Given the same routing decisions on SMSC $S_2$, the IM server $S_1$ uses A's mobile data presence information (and other factors it deems to be important, such as the last time it communicated with the particular user A) to decide that delivery over the packet switched network $N_1$ is not possible or not likely. As a result it negatively acknowledges the message to the SMSC $S_2$ ((3) and (4)). The reception of this negative acknowledgement triggers SMSC $S_2$ to remove the trajectory A→B from its database D ((5) and (6)) and to commence delivery over network $N_2$ using SMS instead ((7), (8), (9) and (10)). The reason for this fallback to SMS is to prevent A from being cut-off from communication with B in situations where A is not present on $N_1$ for a prolonged time, e.g., during holidays abroad or when travelling to more isolated areas. The reason for the removal of the trajectory A→B from the database D is to optimize future communication between A and B and to prevent unnecessary delivery attempts into the IM domain.

Figure 6:
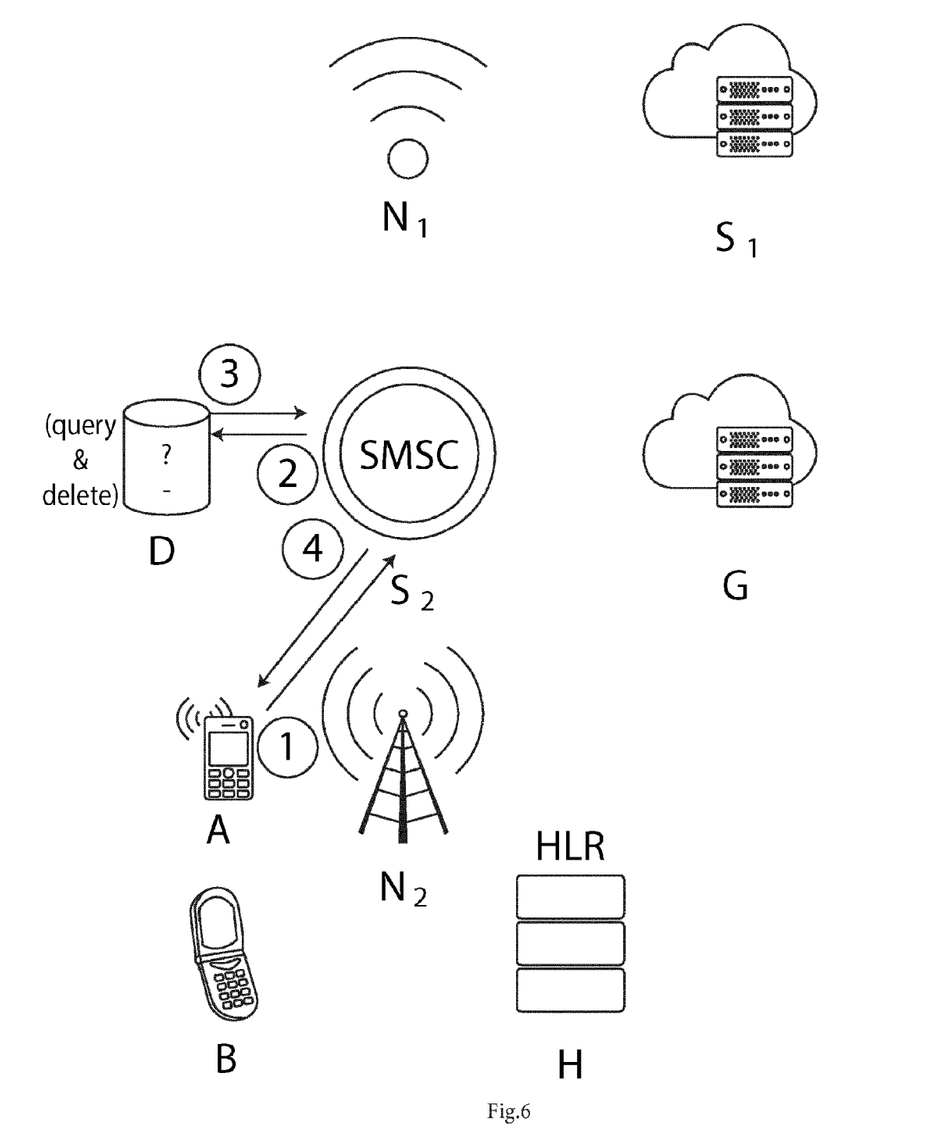
FIG. 6 shows submission of an SMS from an IM user A to an SMS user B.

FIG. 6 illustrates the situation where A decides to submit an SMS via the network $N_2$ intended for B (1), despite the fact that he used IM for communication with B earlier. Just like in FIG. 5, this describes the situation where A is not present on $N_1$ for a prolonged time, e.g., during holidays abroad or when travelling to more isolated areas. Upon message arrival the SMSC $S_2$ queries its trajectory database D (2) and removes the trajectory A→B from it (3) in order to optimize interactions between the SMS and the IM domain. Finally, successful message acceptance is signaled back to A (4).

Figure 7:
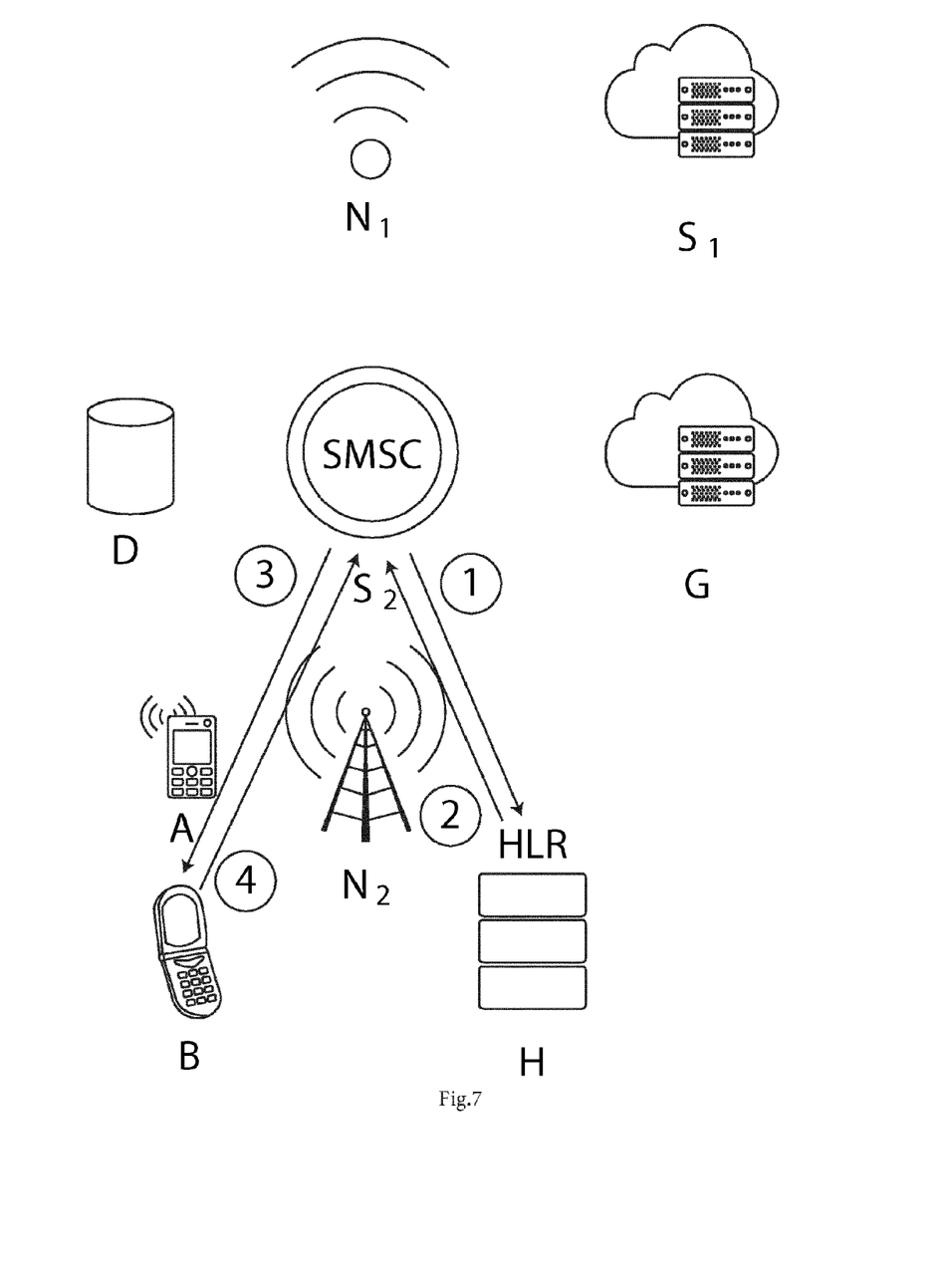
FIG. 7 shows delivery of an SMS from an IM user A to an SMS user B.

FIG. 7 follows directly on FIG. 6 and illustrates a successful query of B's whereabouts in the HLR H by the SMSC $S_2$ ((1) and (2)) and successful delivery into the SMS domain to B via the network $N_2$.

It will be appreciated that the invention achieves excellent versatility for message communication between different types of device. It integrates packet network (such as Instant Messaging services) with ubiquitous mobile network services (such as SMS) as a fallback for communicating with users that are not part of a particular community. It provides intelligence in the Instant Messaging domain to choose SMS as a delivery channel based on the Instant Messaging subscription status of the recipient. Also it allows SMS recipients to respond to messages coming from the Instant Messaging domain and to deliver these responses back into this domain so that both users continue to have an open dialogue from a single interface, without either of them being aware of the technology that is used to deliver their messages. It caters for situations where Instant Messaging users are unavailable on IP for a prolonged time (e.g. roaming abroad while on holiday where extra data charges may apply), providing presence-based fallback to SMS.

This invention provides these advantages for arbitrary handset hardware, arbitrary handset operating systems, and for arbitrary Instant Messaging clients.

The invention is not limited to the embodiments described but may be varied in construction and detail. The gateway may be programmed primarily in software or firmware, and with any suitable number of processors depending on capacity and throughput requirements.

The invention claimed is:

1. A messaging system for allowing a Short Message Service (SMS) message recipient to respond to an IM message sent from an Instant Messaging (IM) domain by delivering a response to the IM message into the IM domain, the messaging system comprising:

an interface for communicating the IM message via a packet network;

an interface for communicating the SMS message via a mobile network;

a messaging server (MS) configured to send and receive IM messages;

a message service center (MSC) configured to send and receive SMS messages;

a processor that interfaces between the packet network and the mobile network for communication of IM messages and SMS messages;

a gateway between the MS and the MSC, and a trajectory database, wherein sending the IM message creates trajectory data between an IM sender and the SMS recipient, wherein the trajectory data is stored in the trajectory database, wherein each stored trajectory data includes an originator address that comprises an MSISDN of the originator device and a terminator address that comprises an MSISDN of the terminator device, and wherein each trajectory is registered with a timestamp in the trajectory database, wherein the processor can access the trajectory database to determine the trajectory data for a message between the IM sender and the SMS recipient, wherein the MSC is configured to access and use a stored trajectory in the trajectory database upon receipt of a response message from the SMS recipient to the IM sender, wherein, if the MSC determines that the stored trajectory between the IM sender and the SMS recipient exists, the MSC queries a home location register (HLR) to retrieve connectivity information determine if the IM sender currently has a mobile data connection, wherein, if the IM sender currently has the mobile data connection, then the MSC:

attaches the connectivity information retrieved from the HLR to the response message;

routes the response message into the IM domain via the packet network using the stored trajectory;

uses the connectivity information when the response message arrives in the IM domain to determine whether to keep the response message in the IM domain for immediate or short term delivery;

acknowledges arrival of the response message; and delivers the response message to the IM sender, wherein, if the IM sender does not currently have the mobile data connection, the MSC routes the response message via the mobile network.

2. The messaging system as claimed in claim 1, wherein the MS is an instant MS.

3. The messaging system as claimed in claim 1, wherein the MSC is an SMSC.

4. The messaging system as claimed in claim 1, wherein the messaging system can archive or delete stored trajectories according to age.

5. The messaging system according to claim 1, wherein the MSC is configured and adapted to delete the stored trajectory in the trajectory database if the IM sender does not currently have a mobile data connection.

6. A messaging method performed by a messaging system comprising: a gateway having interfaces for communicating with a mobile network and a packet network, a messaging server (MS), and a message service center (MSC), the method comprising the steps of:
   interfacing between the mobile network and the packet networks for message communication by:
   maintaining a trajectory database by the gateway; and
   accessing the trajectory database by the processor to determine whether a stored trajectory data for a message between an Instant Messaging (IM) sender and a Short Message Service (SMS) recipient,
      wherein the trajectory data includes an originator address that comprises an MSISDN of the IM sender and a terminator address that comprises an MSISDN of the SMS recipient, and wherein each trajectory is registered together in the trajectory database with a timestamp in the trajectory database;
   updating the timestamp each time the processor accesses the trajectory database;
   configuring the MSC to:
      access and use a stored trajectory between the IM sender and the SMS recipient upon receipt of a response message from the SMS recipient to the IM sender;
      query a home location register (HLR) to retrieve connectivity information to determine if the IM sender currently has a mobile data connection;
      attach the connectivity information retrieved from the HLR to the response message if the IM sender currently has the mobile data connection;
      attempt to route the response message into the IM domain via a packet network delivery via the MS using the stored trajectory;
   informing the MSC if the MS determines that packet network delivery is not possible or likely; and
   updating the trajectory database if the MSC receives an acknowledgement from the MS that the packet network delivery failed.

7. The messaging method as claimed in claim 6, further comprising:
   handling a response message sent by the SMS recipient via the mobile network towards a packet domain, wherein the handling comprises the steps of:
   sending a response message from the SMS recipient to the IM sender via the MSC;
   querying by the MSC the trajectory database to determine whether a trajectory resulting from a prior message from the IM sender in the packet domain to the SMS recipient in the mobile network exists;
      wherein, if a prior trajectory between the IM sender and the SMS recipient exists, the MSC queries a home location register (HLR) to determine whether or not the IM sender currently has a mobile data connection,
      wherein, if the IM sender currently has a mobile data connection, then the MSC receives the address of the serving support node of the IM sender,
      wherein, if the IM sender does not currently have a mobile data connection, then the MSC receives the address of a switching center of the IM sender; and
   responding, by the MSC to the SMS recipient that it has received a response message of the SMS recipient.

8. The messaging method as claimed in claim 6, further comprising using, by the MSC, the mobile data connection information of the IM sender to indicate the last time the MSC communicated with the IM sender.

9. The messaging method as claimed in claim 6, further comprising handling an unsuccessful delivery of the response message into the packet domain via the packet network.

10. The messaging method as claimed in claim 9, further comprising using, by the MSC, the mobile data connection information of the IM sender to determine that delivery of the response message over the packet network is not possible or not likely.

11. The messaging method as claimed in claim 10, further comprising: receiving, by the MSC, a notification that delivery of the response message over the packet network is not possible or not likely; removing by the MSC, upon receiving the notification, the prior trajectory between the IM sender and the SMS recipient from the trajectory database; and delivering of the response message over the mobile network using a mobile network protocol.

12. The messaging method as claimed in claim 11, wherein the message is sent from the IM sender to the SMS recipient via the mobile network whether or not the packet network was used for sending a prior message from the IM sender to the SMS recipient.

13. A messaging method for allowing an SMS message recipient to respond to an IM message delivery from an IM domain by delivering a response to the IM message delivery into the IM domain using a messaging system comprising an interface for communicating the IM message via a packet network;
   an interface for communicating the SMS message via a mobile network; a messaging server (MS) configured to send and receive IM messages;
   a message service center (MSC) configured to send and receive SMS messages;
   a processor adapted to interface between the packet network and the mobile network for communication of messages; a gateway between the MS and the MSC, and a trajectory database, the messaging method comprising:
   creating, when the IM message is sent, trajectory data between an IM sender in the IM domain and an SMS recipient, wherein the trajectory data is stored in the trajectory database, wherein each stored trajectory includes an originator address that comprises an MSISDN of the originator device and a terminator address that comprises an MSISDN of the terminator device, and wherein each trajectory is registered together with a timestamp in the trajectory database;
   accessing the trajectory database by the processor to determine the trajectory data for a message between the IM sender and the SMS recipient;
   accessing and using, by the MSC, a stored trajectory in the trajectory database upon receipt of a response message from the SMS recipient to the IM sender;
   determining, by the MSC, if the stored trajectory between the IM sender and the SMS recipient exists;

querying, by the MSC, if the stored trajectory between the IM sender and the SMS recipient exists, a home location register (HLR) to determine if the IM sender currently has a mobile data connection, retrieving connectivity information from the HLR if the IM sender currently has a mobile data connection, attaching the connectivity information retrieved from the HLR to the response message;

routing by the MSC, if the IM sender currently has the mobile data connection, the response message via the packet network, acknowledging, by the MSC, arrival of the response message, and delivering the response message to the IM sender, and routing by the MSC, if the IM sender does not currently have the mobile data connection, the response message via the mobile network.

* * * * *